Figure 1:
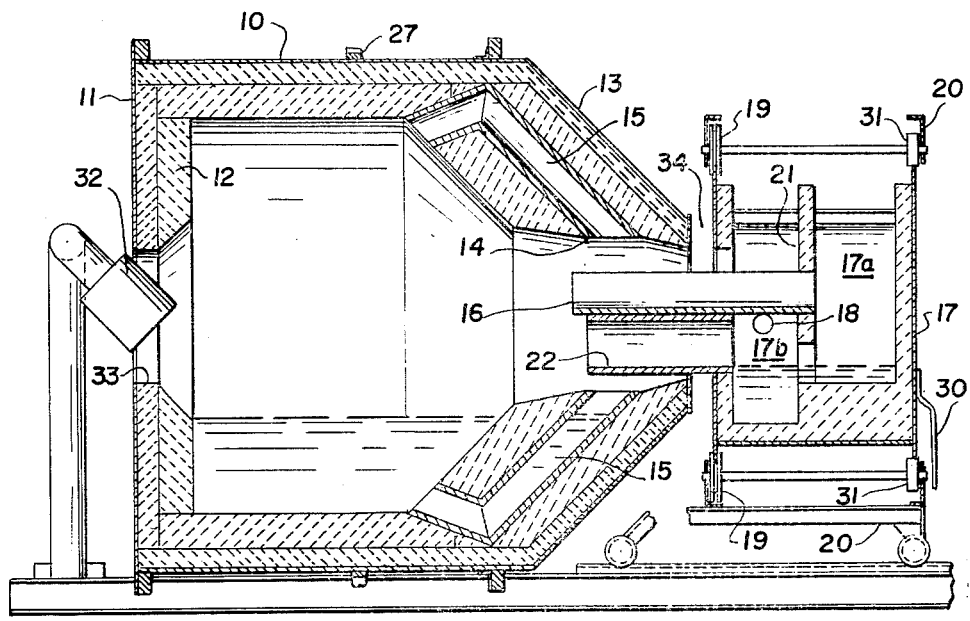

Sept. 14, 1965  B. R. ANKERSEN  3,206,182

ROTARY BARREL SALT BATH FURNACES

Filed Oct. 20, 1961  5 Sheets-Sheet 1

INVENTOR.
Borge Richard Ankersen
BY
his ATTORNEYS

Sept. 14, 1965   B. R. ANKERSEN   3,206,182
ROTARY BARREL SALT BATH FURNACES
Filed Oct. 20, 1961   5 Sheets-Sheet 2
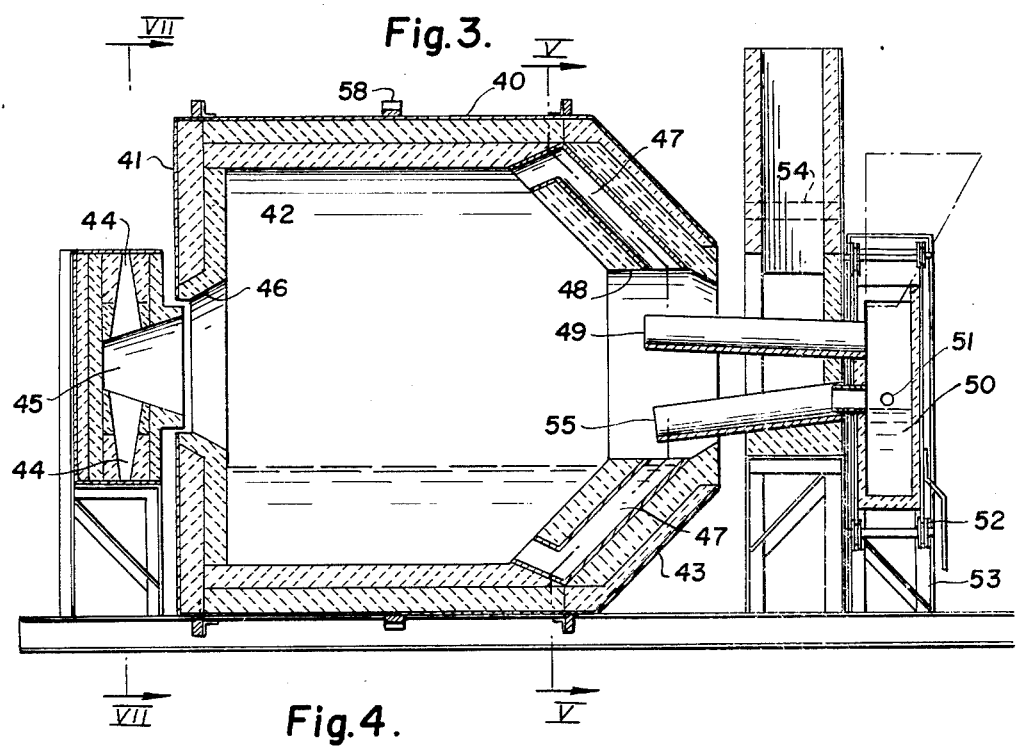
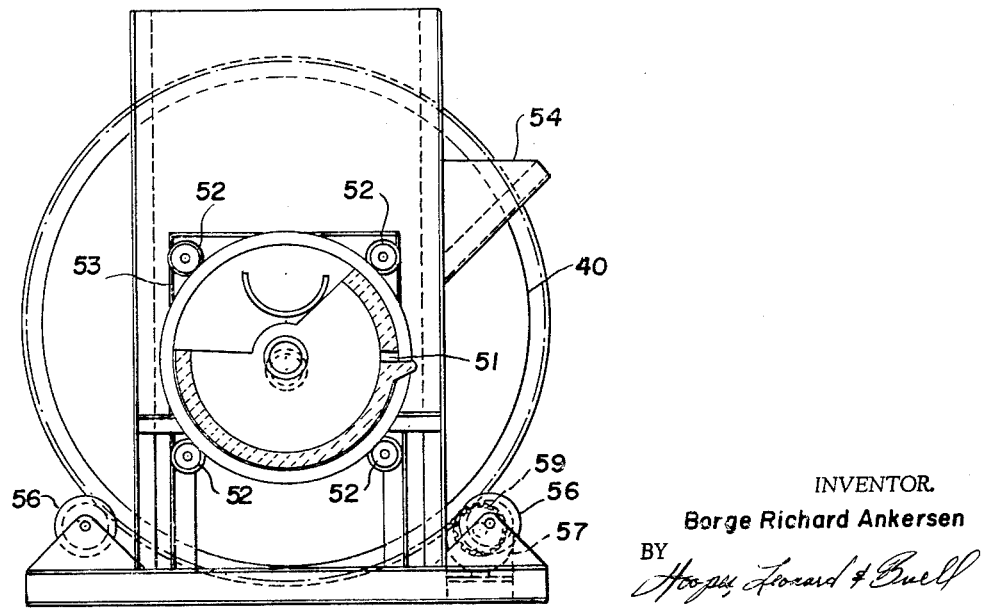
INVENTOR.
Borge Richard Ankersen
BY
his ATTORNEYS INVENTOR.
Borge Richard Ankersen his ATTORNEYS Sept. 14, 1965  B. R. ANKERSEN  3,206,182
ROTARY BARREL SALT BATH FURNACES
Filed Oct. 20, 1961  5 Sheets-Sheet 4

INVENTOR.
Borge Richard Ankersen
BY
his ATTORNEYS

Sept. 14, 1965  B. R. ANKERSEN  3,206,182
ROTARY BARREL SALT BATH FURNACES
Filed Oct. 20, 1961  5 Sheets-Sheet 5

INVENTOR.
Borge Richard Ankersen
BY
his attorneys

United States Patent Office 3,206,182
Patented Sept. 14, 1965

3,206,182
ROTARY BARREL SALT BATH FURNACES
Borge R. Ankersen, 32871 Chatham Lane,
Birmingham, Mich.
Filed Oct. 20, 1961, Ser. No. 146,547
8 Claims. (Cl. 266—33)

This invention relates to rotary barrel salt bath furnaces and pumps and particularly to a rotary barrel type salt furnace for melting or heating highly oxidizable alloys and materials.

There are many industrial situations where it is desirable to melt or heat readily oxidizable materials such as aluminum without the oxidation losses normally encountered. For example, it is frequently desired to melt aluminum chips, filings, turnings and the like scrap. Conventional melting methods are either too slow, too costly or the losses in aluminum through oxidation are too high to be economically feasible. Various attempts to solve such problems have been made but without any real success.

I have invented a furnace structure which will overcome these problems. By the use of my furnace, it is possible to continuously melt aluminum chips and similar fine scrap without excessive losses and without the expensive techniques heretofore proposed.

I provide a cylindrical furnace portion, a fluid heat transfer medium in said furnace, diagonal chordal conduit means extending from a point adjacent the inner wall of the furnace to a point adjacent the axis of the furnace at one end, an opening in said one end, a trough extending into the opening to receive a stream of fluid from said fluid conduits for delivery out of the furnace, burner means directing a flame into said cylindrical portion, drive means rotating said body portion, metal feeder means delivering metal to be melted into said trough, receiver means receiving the stream of fluid heat transfer means and metal and adapted to separate molten metal from fluid heat transfer means, return means carrying the stream of fluid heat transfer means and unmelted metal from the receiver means to the furnace portion and metal feeder means delivering metal to be melted into the stream of fluid heat transfer means.

Figure 2:
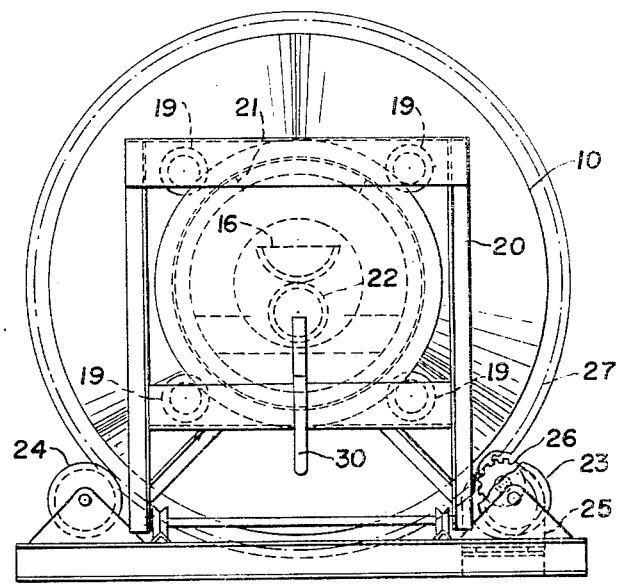
Figure 6:
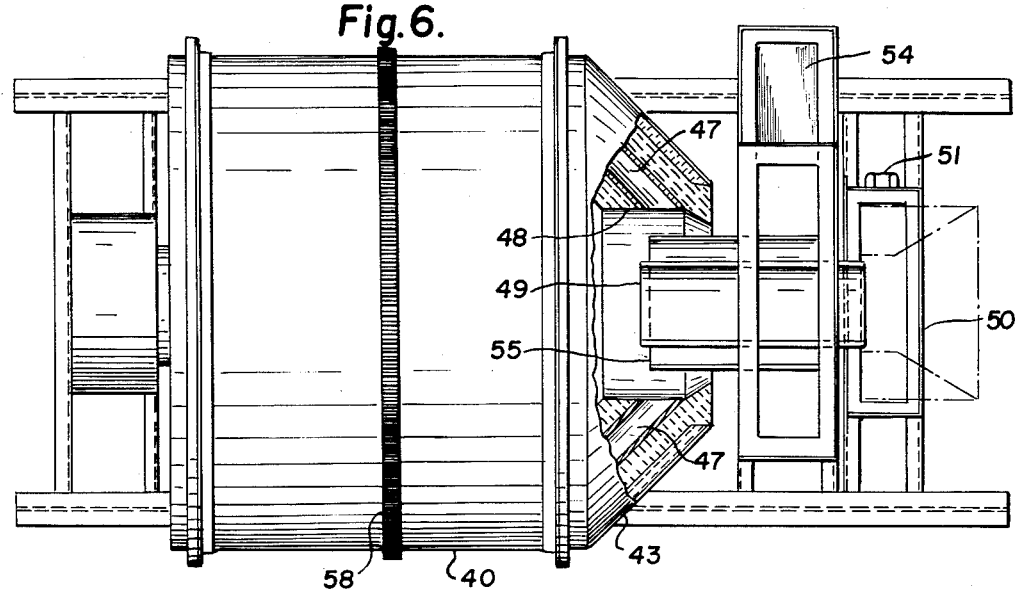
Figure 5:
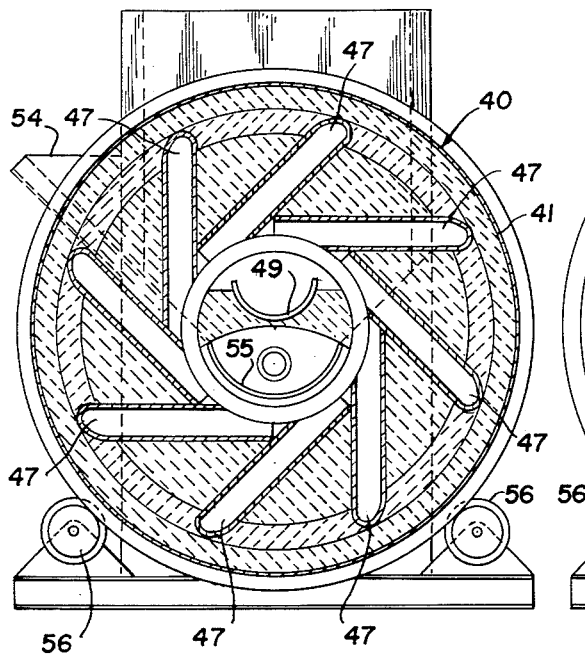
Figure 7:
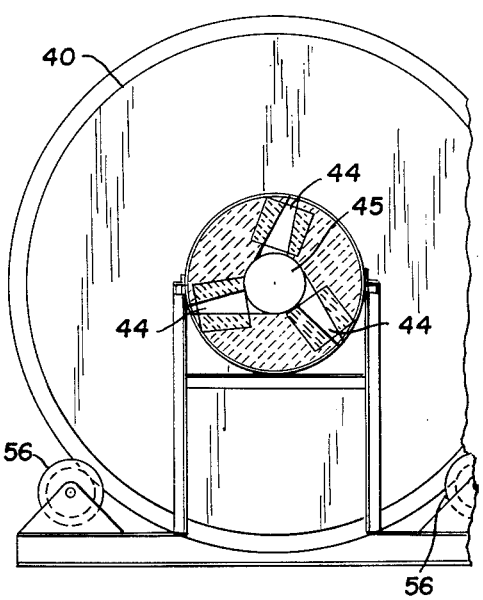
Figure 8:
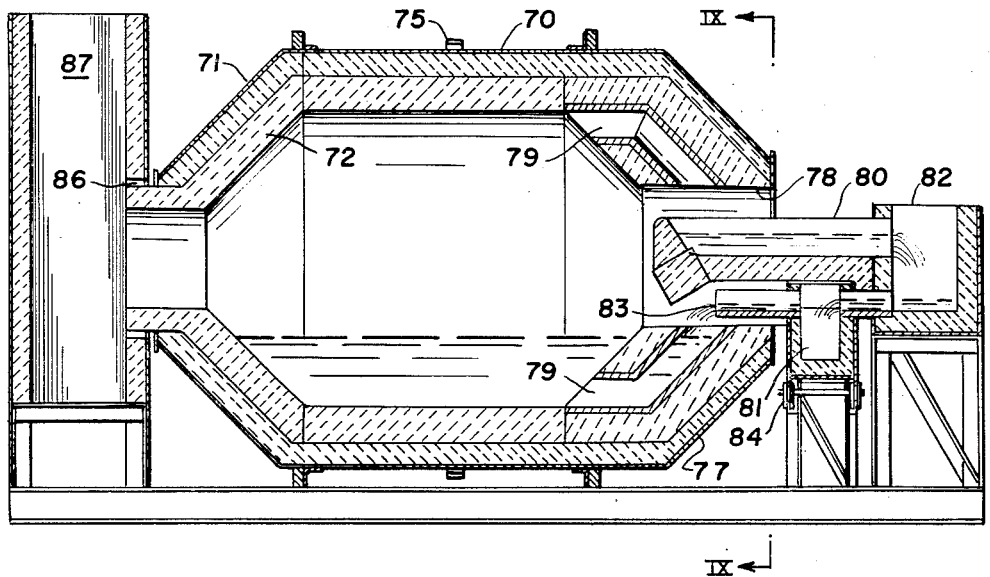
Figure 9:
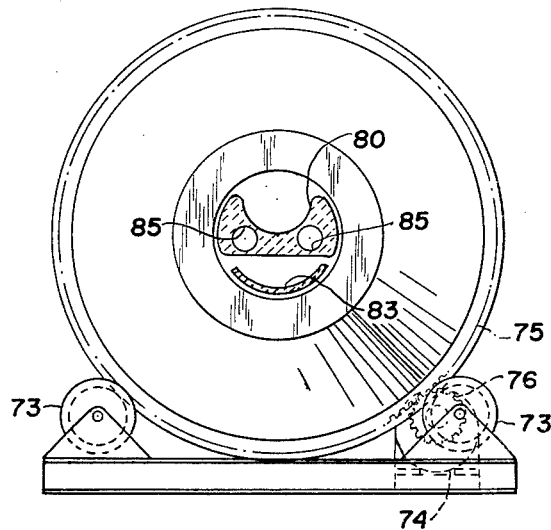
Figure 10:
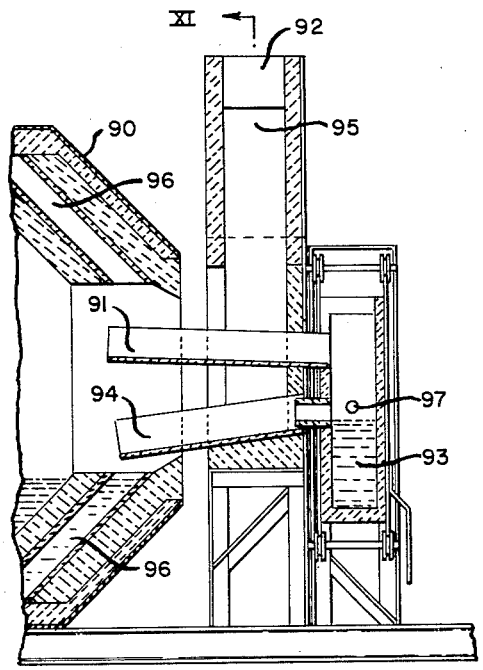
Figure 11:
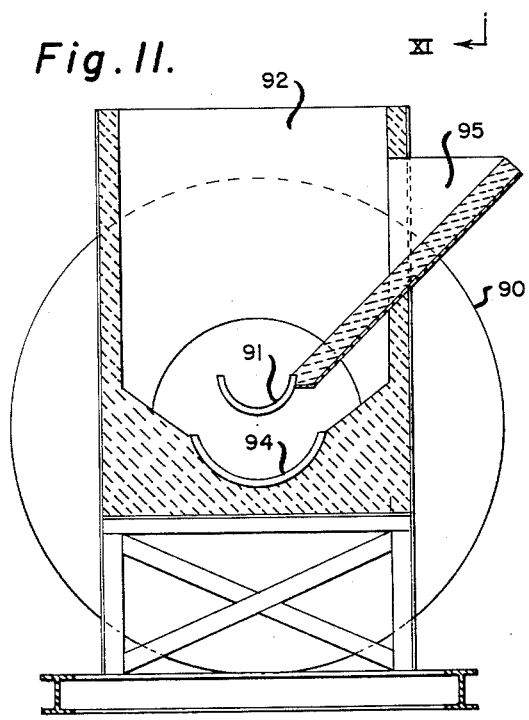

In the foregoing general description, I have set out certain objects, advantages and purposes of my invention. Other objects, advantages and purposes of my invention will be apparent from a consideration of the following description and the accompanying drawings in which:

FIGURE 1 is a longitudinal section through a furnace according to my invention;
FIGURE 2 is an end elevation of the furnace of FIGURE 1 viewed from the right;
FIGURE 3 is a longitudinal section of a second embodiment of furnace according to my invention;
FIGURE 4 is an end elevation of the furnace of FIGURE 3 viewed from the right;
FIGURE 5 is a section on the line V—V of FIGURE 3;
FIGURE 6 is a top plan view partly cut away of the furnace of FIGURE 3;
FIGURE 7 is a section on the line VII—VII of FIGURE 3;
FIGURE 8 is a longitudinal section of a third embodiment of furnace according to my invention;
FIGURE 9 is a section on the line IX—IX of FIGURE 8;
FIGURE 10 is a partial section of a fourth embodiment of furnace according to my invention; and
FIGURE 11 is a section on the line XI—XI of FIGURE 10.

Referring to the drawings, and particularly to FIGURES 1 through 2, I have illustrated a cylindrical furnace body 10 having an outer metal shell 11 and a refractory lining 12. A frusto-conical end portion 13 is provided at one end of the cylindrical furnace body 10 having an opening 14 therein. Spaced elongated passages 15 extend diagonally from the base of frusto-conical end 13 to opening 14 of the frusto-conical end portion. These passages act to deliver fluid from the base of the frusto-conical end 13 to the opening 14. A trough 16 extends into opening 14 and receives the discharge from passages 15. Trough 16 connects with a rotary well 17 having a discharge spout 18. The well 17 is rotatable on guide rolls 19 in a frame 20 at the output end of the furnace. A charging chute 21 is provided above a portion of the trough to feed aluminum chips into the salt flowing in the trough. A return trough 22 lies beneath trough 16 and connects well 17 with the interior of the furnace. The furnace is provided with a molten bath of salt, whose specific gravity is less than that of the metal being melted so that a clean gravity separation is established.

In operation, aluminum or like chips to be melted are fed from chute 21 into trough 16 leading from the furnace. The furnace body is rotated on carrier rolls 23 and 24 by a drive motor 25 acting through pinion 26 and a rack 27 surrounding the outer shell of the furnace. The chips entering trough 16 are immediately submerged by molten salt flowing in the trough. The molten salt carries the chips into well 17 beneath the surface of the salt so that they are covered before any opportunity for oxidation has occurred. The metal which melts settles to the bottom and passes into portion 17a of well 17. The excess salt with unmelted chips is carried into the interior of furnace 10 where melting is completed. Rotation of the furnace causes the molten metal as well as salt to be lifted through the passages 15, which deliver it to trough 16 along with an amount of salt which acts as a protective layer throughout the processing steps. The molten metal passes into well 17 along with new chips from chute 21 and the cycle is repeated.

The aluminum in well 17b is discharged through spout 18 from time to time by lifting handle 30 to rotate the well on supporting rolls 31.

The salt which is recirculated to the furnace is retained and used continuously as the heat transfer and protective media for the metal.

The furnace is fired by a burner 32 firing through opening 33 in the end of the furnace opposite trough 16. Preferably the burner is directed downwardly onto the salt as shown. Flue gases are discharged through area 34 above trough 16.

In the form shown in FIGURES 3 through 7 I have illustrated a furnace 40 having an outer steel shell 41 and a refractory lining 42. A frusto-conical end portion 43 is provided at one end of the body of furnace 40. The furnace is heated by radial burners 44 firing into axial burner block opening 45 which passes through an opening 46 in the end of the furnace opposite the frusto-conical end. Spaced passages 47 extend diagonally from the periphery of furnace 40 to opening 48 in the frusto-conical end 43 so as to discharge into trough 49 mounted on a rotary well 50 having discharge spout 51. The well is rotatable on guide rolls 52 in frame 53 at the output end of the furnace.

A charging chute 54 is provided above the trough 55 of the furnace at the frusto-conical end. Metal chips are fed into chute 54 and from thence into the molten salt flowing in trough 55 where they are carried into furnace 42. The metal which melts is collected in the bottom of furnace 42 and then discharged through passages 47 to trough 49 along with a protective coating of salt. The molten metal is separated in well 50 as in the case of the furnace of FIGURE 1.

The furnace is rotated on rollers 56 in usual manner by motor 57 driving rack 58 through pinion 59.

The operation of this embodiment is essentially the same as that of FIGURES 1 through 2 with certain obvious modification.

In FIGURES 8 and 9 I have illustrated a third embodiment in which furnace 70 is provided with an outer metal shell 71, a refractory lining 72 and is rotated on rollers 73 in conventional manner by motor 74 driving rack 75 through pinion 76 similar to FIGURE 1. A frusto-conical end 77 is provided at one end having an axial opening 78 receiving salt through diagonal passages 79 as in FIGURE 1. Trough 80 extends through opening 78 and delivers salt to well 81 through well 82. Aluminum chips to be melted are fed into trough 80 where they are submerged and carried into well 81 through well 82. Unmelted chips and salt return to the furnace through conduit 83 where melting of the metal is completed. The molten metal and salt are delivered to trough 80 as previously described. Molten aluminum collected in well 81 is discharged by rotating the well on rollers 84. The furnace is fired by axial burners 85 in trough 80. The combustion gases pass through the opposite end of the furnace through opening 86 into stack 87.

In FIGURES 10 and 11 I have illustrated a fourth embodiment of my invention in which a furnace 90, similar to furnace 10 of FIGURE 1 is provided with an outlet trough 91 which passes through stack 92 to well 93. A return salt trough 94 returns salt to furnace 90. A feeder 95 delivers scrap turnings and the like to be melted to the stream of salt in the trough 91 going to well 93. The metal which melts collects in the bottom of well 93, while the unmelted chips and salt are returned to the furnace 90 through trough 94 where the chips are finally melted. The molten metal in the furnace 90 is then discharged through passages 96 into trough 91. The well is discharged through discharge spout 97.

The operation of this embodiment is as follows:

Salt is melted in the body of the furnace as described in connection with FIGURE 1. The salt is delivered to trough 91 and thence to well 93 from which it flows back to furnace 90 through return trough 94. The salt in trough 94 picks up unmelted scrap turningas and delivers them in the cascading stream to the interior of the furnace where they are melted and pass with the salt to well 93 where the molten metal is separated and tapped through cap hole 96.

In the foregoing specification I have illustrated and described certain preferred embodiments of my invention, however, it will be understood that the invention may be otherwise embodied within the scope of the following claims.

I claim:

1. A metal melting furnace for melting oxidizable metals and the like comprising a cylindrical housing, a fluid heat transfer medium in said cylindrical portion, a frusto conical end portion on one end of said housing, an opening in the apex of said frusto conical end, spaced enclosed passages open at one end adjacent the inner periphery of the housing adjacent the base of the frusto conical end portion and extending to and discharging into the opening in the frusto conical end, and adapted to deliver fluid heat transfer medium to the said apex, a trough extending into the opening in the apex of said frusto conical end to receive fluid from said passages, burner means directing a flame through said cylindrical housing, feeder means delivering metal to be melted into the trough whereby the fluid heat transfer medium receives said metal, drive means rotating said cylindrical housing, well means adjacent the housing receiving the fluid heat transfer means and the metal therein and separating the molten metal from the fluid heat transfer medium and unmelted metal and return means delivering the fluid heat transfer medium and unmelted metal to the interior of the furnace.

2. A metal melting furnace as claimed in claim 1 wherein the feeder means delivers metals to be melted into the trough between an exhaust opening above the trough and the discharge end of the trough to cause the fluid heat transfer medium carrying metal to cascade into the well means.

3. A metal melting furnace as claimed in claim 1 wherein the well means includes a generally cylindrical housing, roller means supporting said housing for rotation about its axis, discharge means on said housing adapted on rotation of said housing to deliver molten metal from the housing, and means for rotating said housing about its axis.

4. A metal melting furnace as claimed in claim 1 wherein the burner means extends through an opening in the end of the cylindrical housing opposite the apex of the frusto conical end.

5. A metal melting furnace as claimed in claim 1 wherein the burner means lies in the base of the trough.

6. A metal melting furnace for melting oxidizable metals and the like comprising a cylindrical housing, a frusto conical end portion on one end of said housing, a fluid heat transfer medium in said cylindrical portion, an opening in the apex of said frusto conical end, spaced fluid delivery means open at one end adjacent the inner periphery of the housing adjacent the base of the frusto conical end and extending to and discharging in the opening in the frusto conical end, a trough extending into the opening in the apex of said frusto conical end to receive fluid from said passages, burner means directing a flame through said cylindrical housing, feeder means delivering metal to be melted into the trough whereby the fluid heat transfer medium receives said metal, drive means rotating said cylindrical housing, well means adjacent the housing receiving the fluid heat transfer means and the metal therein and separating the molten metal from the fluid heat transfer medium and unmelted metal and return means delivering the fluid heat transfer medium and unmelted metal to the interior of the furnace.

7. A metal melting furnace for melting oxidizable metals and the like comprising a generally cylindrical body portion, a fluid heat transfer medium in said cylindrical portion, an opening in the apex of said frusto conical end, spaced enclosed passages open at one end adjacent the inner periphery of the body portion adjacent the base of the frusto conical end portion and extending to and discharging into the opening in the frusto conical end, and adapted to deliver fluid heat transfer medium to the said axis, a trough extending into the opening in the frusto conical end of the body portion at the axis end to receive fluid from said passages, burner means directing a flame through said cylindrical portion, feeder means delivering metal to be melted into the trough whereby the fluid heat transfer medium receives said metal, drive means rotating said cylindrical portion, well means adjacent the body portion receiving the fluid heat transfer means and the metal therein and separating the molten metal from the fluid heat transfer medium and unmelted metal and return means delivering the fluid heat transfer medium and unmelted metal to the interior of the body portion.

8. A metal melting furnace for melting oxidizable metals and the like comprising a generally cylindrical body portion, a fluid heat transfer medium in said cylindrical portion, an opening at one end on the axis of the body, spaced fluid delivery means open at one end adjacent the inner periphery of the body adjacent the base of the frusto conical end, and extending to and discharging in the opening at the axis of the body portion and adapted to deliver fluid heat transfer medium to said axis, a trough extending into the body portion through the opening at the axis thereof to receive fluid from said passages, burner means directing a flame through said cylindrical body, feeder means delivering metal to be melted into the trough whereby the fluid heat transfer medium receives said metal, drive means rotating said cylindrical body, well means adjacent the body portion receiving the fluid heat transfer means and the metal therein and separating the molten metal from the fluid heat transfer medium and unmelted metal and return means delivering the fluid heat transfer medium and unmelted metal to the interior of the body portion.

References Cited by the Examiner

UNITED STATES PATENTS

| | | | |
|---|---|---|---|
| 1,841,625 | 1/32 | Musso | 266—18 |
| 1,972,679 | 9/34 | Cousins | 266—38 |
| 2,676,010 | 4/54 | Matthies | 266—33 |
| 2,768,075 | 10/56 | Sterental | 75—68 |
| 2,878,004 | 3/59 | Saeman | 266—33 |
| 2,962,277 | 11/60 | Morrill | 75—60 |
| 2,987,391 | 6/61 | Foster et al. | 75—68 |

MORRIS O. WOLK, *Primary Examiner.*

MARCUS U. LYONS, RAY K. WINDHAM, DELBERT E. GANTZ, *Examiners.*